(12) United States Patent
Yang et al.

(10) Patent No.: US 11,705,019 B2
(45) Date of Patent: Jul. 18, 2023

(54) DYNAMIC CONTACT HEAT TRANSFER SIMULATION DEVICE FOR ROLLING HEAVY-LOAD DEFORMATION ZONE

(71) Applicant: Yanshan University, Qinhuangdao (CN)

(72) Inventors: Lipo Yang, Qinhuangdao (CN); Shuguang Liu, Qinhuangdao (CN); Jiaxuan Yang, Qinhuangdao (CN); Yunpeng Liu, Qinhuangdao (CN); Gengliang Liu, Qinhuangdao (CN); Hailong Zhang, Qinhuangdao (CN)

(73) Assignee: YANSHAN UNIVERSITY, Qinhuangdao (CN)

( * ) Notice: Subject to any disclaimer, the term of this patent is extended or adjusted under 35 U.S.C. 154(b) by 283 days.

(21) Appl. No.: 17/143,245

(22) Filed: Jan. 7, 2021

(65) Prior Publication Data
US 2021/0220884 A1 Jul. 22, 2021

(30) Foreign Application Priority Data
Jan. 20, 2020 (CN) .......................... 202010066377.2

(51) Int. Cl.
| | |
|---|---|
| G09B 23/16 | (2006.01) |
| B21B 37/74 | (2006.01) |
| B21B 45/00 | (2006.01) |
| G09B 25/02 | (2006.01) |
| G01K 3/00 | (2006.01) |

(52) U.S. Cl.
CPC .............. *G09B 23/16* (2013.01); *B21B 37/74* (2013.01); *B21B 45/004* (2013.01); *G01K 3/00* (2013.01); *G09B 25/02* (2013.01)

(58) Field of Classification Search
CPC .......... B21B 37/74; B21B 37/46; B21B 38/00
USPC .......................................... 72/252, 220, 208
See application file for complete search history.

(56) References Cited

U.S. PATENT DOCUMENTS 3,391,561 A * 7/1968 Calmes ................... B21B 17/08
72/97
3,862,560 A * 1/1975 Grinshpun ............ B21B 21/045
72/220

* cited by examiner

*Primary Examiner* — John Kwon
(74) *Attorney, Agent, or Firm* — IPro, PLLC

(57) ABSTRACT

The present invention provides a dynamic contact heat transfer simulation device for rolling heavy-load deformation zone. The device includes a control system, a data acquisition system, a pressure-adjustable fixed cold end, a rotating chuck, a temperature-adjustable heat-conducting rod and an speed-adjustable rotation hot end; the device utilizes the rotating chuck and the speed-adjustable rotating hot end to adjust the rotation speed in real time according to the actual rolling conditions, simulate the working conditions of the actual rolling heavy-load deformation zone, and accurately obtain the dynamic heat transfer coefficient of the rotating contact interface under variable load pressure conditions.

3 Claims, 5 Drawing Sheets

DYNAMIC CONTACT HEAT TRANSFER SIMULATION DEVICE FOR ROLLING HEAVY-LOAD DEFORMATION ZONE

TECHNICAL FIELD

The present invention belongs to the field of automatic measurement of dynamic contact heat transfer coefficient in a heavy-load deformation zone, and in particular relates to a dynamic contact heat transfer simulation device for rolling heavy-load deformation zone, which is applicable to the simulation measurement of the dynamic contact heat transfer process in the heavy-load deformation zone during the rolling process of steel strip, aluminum strip, copper strip and other plate and strip products.

BACKGROUND TECHNOLOGY

The contact heat transfer conditions of the rolling deformation zone will largely affect the contact friction conditions of the strip, oil film thickness, lubrication conditions, and the forming accuracy or dimensional error of the final product, especially for wide thin strips with large width to thickness ratios, during the rolling process, the impact of the high pressure heavy-load "negative" roll gap pressing on its multi-scale deformation process increases dramatically, and the transient thermal effect must not be ignored or oversimplified. A large number of engineering practices have shown that the range of local thermal expansion on the roll surface and the temperature change of the strip is very narrow and rapid, but it is enough to affect the roll gap shape, contact interface, and internal stress and strain state of the rolled piece in the heavy-load deformation zone, which often causes large deviations in the transverse thickness difference, flatness and surface quality. However, up to now, the contact heat transfer process in the rolling deformation zone is still in a chaotic state, and the lack of accurate theoretical models and measuring devices makes it impossible to quantitatively evaluate the heavy-load contact dynamic heat transfer coefficient and friction contact conditions in actual working conditions.

Traditional solid interface contact heat transfer devices, all static contact, only change the pressure and surface roughness, obtaining different contact interface conditions, measuring thermal conductivity and heat transfer coefficient, the relative error is large, while there is no lubricating medium or oil film thickness. Therefore, the traditional solid interface contact heat transfer device is too simple and idealized, and cannot accurately simulate the real rolling heavy-load deformation zone working conditions, and it is not possible to obtain the dynamic heat transfer parameters of the heavy-load contact under the conditions of rotating friction and high-pressure rolling conditions such as lubricating medium, oil film thickness or friction conditions (such as dry friction, boundary friction, fluid friction and mixed friction), which enables the traditional contact interface heat transfer coefficient to transpose between the measured results and actual rolling conditions parameters, and there is a relatively large boundary condition errors, which seriously affect the calculation accuracy of the mathematical model and the actual control accuracy of the engineering, and regression coefficients or empirical techniques have to be used for error compensation or parameter correction.

SUMMARY OF THE INVENTION

The technical problem to be solved by the present invention is to provide a device for quantitatively evaluating the heavy-load contact dynamic heat transfer coefficient and friction contact conditions of the heavy-load contact interface of the strip rolling deformation zone.

In order to solve the above technical problems, the present invention provides a dynamic contact heat transfer simulation device for rolling heavy-load deformation zone, comprising a thermal insulation cover, a hydraulic cylinder, a control relay, a pressure sensor, a pressure-adjustable fixed cold end, a thermocouple, a control system, and a data acquisition system, a heating furnace, a motor, a rotating chuck, a temperature-adjustable heat-conducting rod, a connecting mechanism, a temperature-measuring slip ring mechanism, a speed-adjustable rotating hot end, a moving chuck and a cooling pipe;

the heating furnace is used for heating the temperature-adjustable heat-conducting rod, and a temperature rise curve of the heating furnace is controlled by the control system;

a first end of the temperature-adjustable heat-conducting rod is clamped on the rotating chuck, and the rotating chuck is connected with the motor; a second end of the temperature-adjustable heat-conducting rod is connected to the speed-adjustable rotating hot end through the connecting mechanism, and the motor drives the speed-adjustable rotating hot end to rotate together by driving the adjustable-temperature heat-conducting rod to rotate;

lubricant is introduced into contact interface between the speed-adjustable rotating hot end and the pressure-adjustable fixed cold end, and the control system controls lubricant quantity of a hydraulic oil pump so that lubricating oil slowly flows into the contact interface between the pressure-adjustable fixed cold end and the speed-adjustable rotating hot end, to ensure that a stable lubricating oil film is formed at the contact interface;

the moving chuck is used to mount the pressure-adjustable fixed cold end, and the cooling tube is provided inside the moving chuck; the thermocouple installed on the pressure-adjustable fixed cold end for temperature measurement passes through the thermal insulation cover and is connected to the data acquisition system;

the hydraulic cylinder is connected with the moving chuck, and the hydraulic cylinder pushes the moving chuck to drive the pressure-adjustable fixed cold end to contact with the speed-adjustable rotating hot end, and ensure a stable pressure between two specimens, the control system controls the hydraulic cylinder through a hydraulic control relay;

the pressure sensor installed between the hydraulic cylinder and the moving chuck is connected to the data acquisition system;

the thermocouple installed on the speed-adjustable rotating hot end for temperature measurement is slidably connected to the temperature-measuring slip ring mechanism, and transmits signals to the data acquisition system through outer ring wire of the temperature-measuring slip ring mechanism;

the control system is a control device that controls the temperature rise curve of the heating furnace, and processes, calculates, and stores the data collected by the data acquisition system.

Preferably, the contact interface between the speed-adjustable rotating hot end and the pressure-adjustable fixed cold end is etched with an oil reservoir capable of storing the lubricant, and an oil through hole is machined at the center of the speed-adjustable rotating hot end, and the hydraulic oil pump injects the lubricant into the contact interface through the oil through hole to form a lubricating oil film with a stable thickness.

Preferably, the closed-loop control system can synchronously control cold end pressure, hot end rotation speed, contact interface lubrication flow and thermocouple acquisition, and simulate thermal conductivity law of transient temperature under different rolling speeds, pressures, cooling, lubrication and friction conditions in real time according to actual rolling conditions, while calculating contact dynamic heat transfer coefficient of the heavy-load deformation zone.

Preferably, the temperature-measuring slip ring mechanism is mounted on the speed-adjustable rotating hot end, an inner ring of the temperature-measuring slip ring mechanism rotates synchronously with the speed-adjustable rotating hot end, and an outer ring of the temperature-measuring slip ring mechanism is fixed to prevent winding of the thermocouple in rotating state.

The present invention has the following beneficial effects:

The dynamic contact heat transfer simulation device for rolling heavy-load deformation zone proposed in the present invention uses an speed-adjustable rotating hot end to adjust the rotation speed in real time according to the actual rolling conditions, and simulates the working conditions of actual rolling heavy-load deformation zone, and accurately obtains the dynamic heat transfer coefficient of the rotating contact interface under variable load pressure conditions; secondly, it can change the lubricating medium and oil film conditions, dynamically adjust the dynamic contact interface of the lubrication conditions, and actually measure the heat transfer process under different friction conditions, namely dry friction, boundary friction, fluid friction, and mixed friction; in addition, the closed-loop control system is used to adjust online parameters in real time to simulate the speed, pressure, friction, oil film thickness and other heat transfer conditions under acceleration and deceleration conditions, so as to provide necessary heat transfer boundary parameters for the roll system elastic model and strip metal model of the rolling process.

MAIN REFERENCE SIGNS OF THE DRAWINGS (1) thermal insulation cover, (2) hydraulic cylinder, (3) control relay, (4) RNT-33T load cell, (5) AZ31B magnesium alloy rod, (6) K-type armored thermocouple, (7) closed-loop control system, (8) data acquisition system, (9) stainless steel heating furnace, (10) motor, (11) rotating chuck, (12) temperature-adjustable heat-conducting copper rod, (13) Key, (14) temperature-measuring slip ring mechanism, (15) 9Cr2Mo alloy steel rod, (16) cold rolling liquid, (17) moving chuck, (18) cooling pipe, (19) roll, (20) rolled piece, (21) inlet elastic zone, (22) rear sliding zone, (23) stagnation zone, (24) front sliding zone, (25) outlet elastic zone.

DETAILED DESCRIPTION OF THE PREFERRED EMBODIMENTS

In the following, the embodiments of the present invention will be described with reference to the accompanying drawings.

This embodiment will be specifically described below in conjunction with FIG. 1

Figure 1:
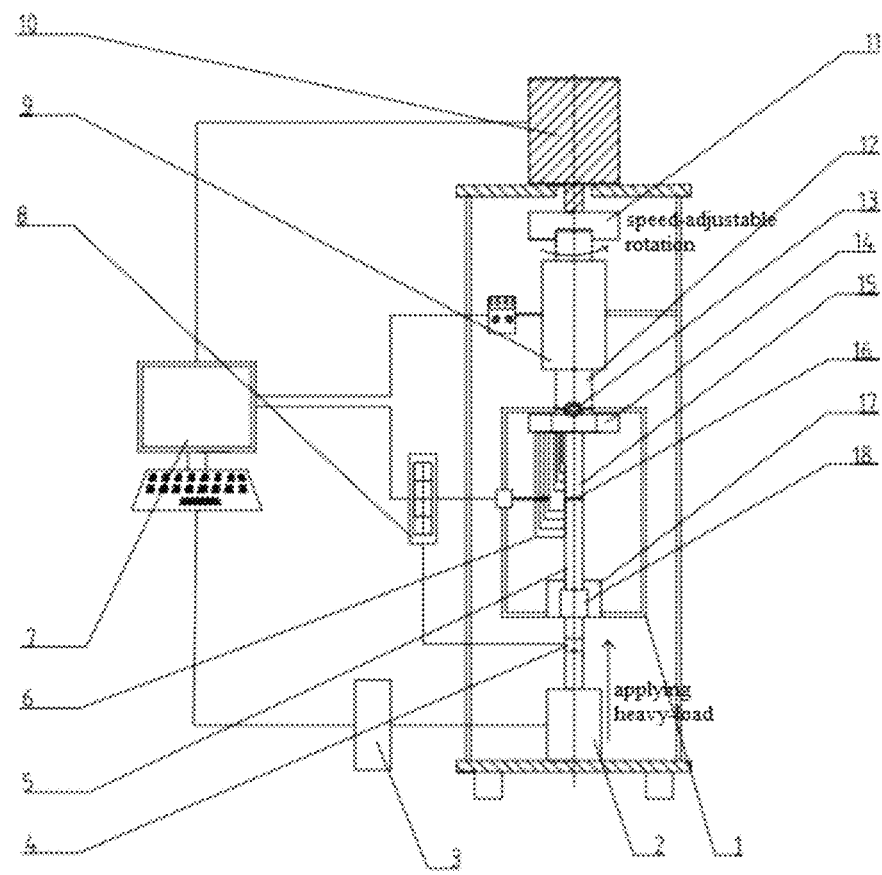
FIG. 1 is a schematic diagram of a pressure-adjustable rotatable heat transfer device according to an embodiment of the present invention.

FIG. 1 is a schematic diagram of a pressure-adjustable rotatable heat transfer device, which is provided with thermal insulation cover 1, hydraulic cylinder 2, control relay 3, RNT-33T load cell 4, AZ31B magnesium alloy rod 5, K-type armored thermocouple 6, closed-loop control system 7, data acquisition system 8, NI 9213 data acquisition card, NI DAQ-9187 data acquisition box, stainless steel heating furnace 9, motor 10, rotating chuck 11, temperature-adjustable heat-conducting copper rod 12, key 13, temperature-measuring slip ring mechanism 14, 9Cr2Mo alloy steel rod 15, moving chuck 17 and cooling pipe 18;

The thermal insulation cover is made of aluminum silicate needle punched blanket.

The data acquisition system 8 includes the NI 9213 data acquisition card and the NI DAQ-9187 data acquisition box.

The stainless steel heating furnace 9 for heating the temperature-adjustable heat-conducting copper rod 12 is connected to the closed-loop control system 7, through which the temperature rise curve is controlled.

The temperature-adjustable heat-conducting copper rod 12 is clamped on the rotating chuck 11 and connected to the motor 10. The temperature-adjustable heat-conducting copper rod 12 is connected with the 9Cr2Mo alloy steel rod 15 through the key 13, and the motor 10 drives the temperature-adjustable heat-conducting copper rod 12 to rotate while driving the 9Cr2Mo alloy steel rod 15 to rotate together, The cold rolling liquid 16 is introduced into the contact interface between the 9Cr2Mo alloy steel rod 15 and the AZ31B magnesium alloy rod 5, and the amount of the cold rolling liquid is controlled by the closed-loop control system 7, thereby ensuring the formation of a stable lubricating oil film at the interface.

The hydraulic cylinder 2 is connected with the moving chuck 17 for clamping the AZ31B magnesium alloy rod 5, and the hydraulic cylinder 2 is connected with the closed-loop control system 7 through the hydraulic control relay 3.

The RNT-33T load cell 4 is connected with the NI 9213 data acquisition card, and then the NI DAQ-9187 data acquisition box transmits the collected pressure data to the closed-loop control system 7 for processing. The moving chuck 17 is provided with a cooling pipe 18 inside. The K-type armored thermocouple 6 for temperature measurement on the AZ31B magnesium alloy rod 5 passes through the thermal insulation cover 1 and is connected to the NI 9213 data acquisition card and the NI DAQ-9187 data acquisition box, and transmits the data to the closed-loop control system 7 for processing and calculation. The K-type armored thermocouple 6 for temperature measurement on the 9Cr2Mo alloy steel rod 15 is first connected to the temperature-measuring slip ring mechanism 14, and then the signal is transmitted to the NI 9213 data acquisition card by the outer ring wire of the temperature-measuring slip ring mechanism 14.

The NI DAQ-9187 data acquisition box is connected to the closed-loop control system 7, and the closed-loop control system 7 processes, calculates, and stores the data transmitted from the NI DAQ-9187 data acquisition box.

The measurement process includes the following steps:

First of all, the experiment selects two kinds of simulated specimen materials: AZ31B magnesium alloy rod 5 and 9Cr2Mo alloy steel rod 15 with a diameter of 20 mm and a length of 80 mm, and the EDM (electrical discharge machining) punching machine is used to drill on the surfaces of the two specimens at equal distances. The diameter of the aperture is the same as the diameter of the selected temperature-measuring K-type armored thermocouple as 1 mm. Polish the contact surface of the two specimens with sandpaper to ensure the surface morphology (surface roughness) of the contact interface of the two specimens and the contact morphology (surface roughness) of the roll and the rolled piece is the same as 0.374 μm. The AZ31B magnesium alloy rod is clamped on the moving chuck as the pressure-adjustable fixed cold end; the 9Cr2Mo alloy steel rod 15 is connected with the temperature-adjustable heat-conducting copper rod 12 as the speed-adjustable rotating hot end.

Next, set up the temperature-measuring device used for the experiment. Calibrate the K-type armored thermocouple 6 used in the experiment, and then insert the calibrated K-type armored thermocouple 6 into the small holes reserved in the two specimens. The temperature-measuring slip ring device is mounted on the 9Cr2Mo alloy steel rod 15 as the speed-adjustable rotating hot end, with which the inner ring thereof rotates synchronously, and the outer ring thereof is fixed. The front end of the K-type armored thermocouple 6 for measuring the temperature of the 9Cr2Mo alloy steel rod 15 is inserted into the small hole reserved in the specimens, and the other end is connected to the inner ring of the temperature-measuring slip ring mechanism 14, the inner ring transmits the signal to the outer ring, and the voltage signal is derived from the wire leading from the outer ring, which is connected to the NI 9213 data acquisition card and the NI DAQ-9187 data acquisition box, and the temperature collected by the thermocouple is displayed, stored, and processed in real time through the Labview software accompanying the acquisition card.

Activate the heating device. According to the principle of contact heat transfer coefficient measurement, the speed-adjustable rotating hot end needs to be heated, and the stainless steel heating furnace used for heating controls the heating temperature through the closed-loop control system 7. AZ31B magnesium alloy is easier to form when rolled at 225° C., so the interface temperature is preset to 225° C. When the interface temperature of the two contact surfaces of the specimens reaches 225° C., the heating furnace maintains the temperature.

Activate the hydraulic loading device and lubrication device. The hydraulic cylinder 2 starts to work, so that the AZ31B magnesium alloy rod 5 is in contact with the 9Cr2Mo alloy steel rod 15 at a slow speed, and the cold rolling liquid 16 is slowly introduced into the interface between the two specimens. The oil reservoir on the specimens stores the cold rolling liquid to form a lubricating oil film of stable thickness. The hydraulic cylinder continues to load and stops when the load pressure reaches 8 Mpa.

Activate the cooling water circulation device. The moving chuck 17 is equipped with a cooling water circulation system to protect the chuck from damage due to high temperature on the one hand, and ensure a stable heat flow between the AZ31B magnesium alloy rod 5 and the 9Cr2Mo alloy steel rod 15 on the other hand.

Activate the rotating device. The temperature-adjustable heat-conducting copper rod 12 is placed in the stainless steel heating furnace 9 and mounted on the rotating chuck 11, which is connected with the motor 10, and the rotating chuck 11 is driven to rotate by the motor. The 9Cr2Mo alloy steel rod 15 is connected to the temperature-adjustable heat-conducting copper rod 12 through a key. The motor drives the temperature-adjustable heat-conducting copper rod 12 to rotate while driving the 9Cr2Mo alloy steel rod 15 to rotate. According to the rolling conditions, the rotational speed is set to 12 r/min, forming a rotating heavy-load contact interface under high pressure.

Activate the data acquisition system to collect the time temperature history of the AZ31B magnesium alloy rod 5 and the 9Cr2Mo alloy steel rod 15 at various points.

After a certain period of heating, the temperature of the two specimens gradually reached a stable state, and the contact interface temperature reached 225° C. After a period of heat preservation treatment, the heating was stopped and the experimental data was saved.

After the measurement, the heating furnace 9 is turned off, the hydraulic loading system is unloaded, and the specimens are taken out after cooling-down.

Figure 2A:
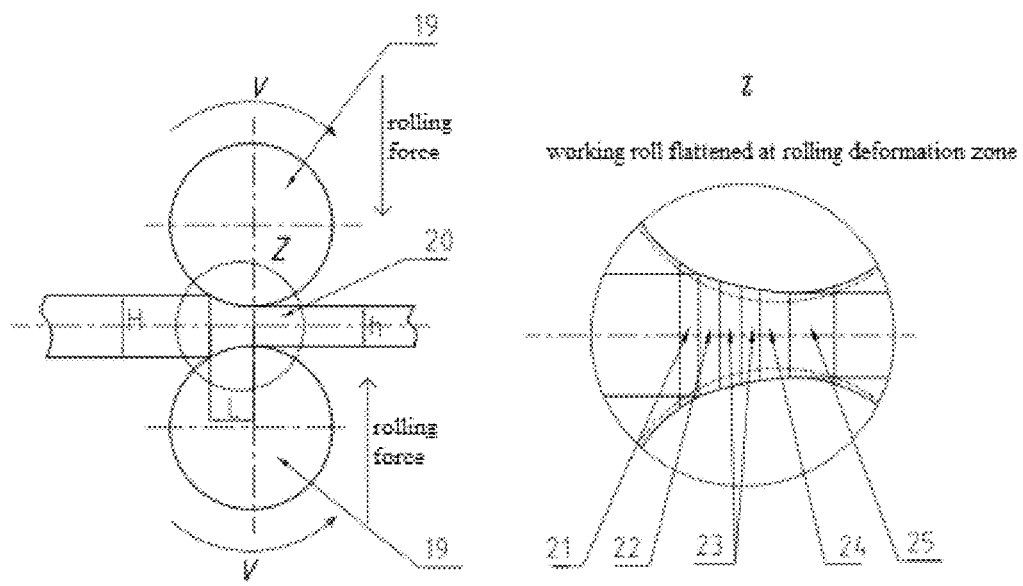
FIG. 2a is a schematic diagram of the contact interface of the rolling heavy-load deformation zone.

FIG. 2a is a schematic diagram of the contact interface of the rolling heavy-load deformation zone.

The area deformed under the action of the roll is called the rolling heavy-load deformation zone. The rolling heavy-load deformation zone can be divided into the inlet elastic zone 21, the front sliding zone 22, the stagnation zone 23, the rear sliding zone 24, and the outlet elastic zone 25. In the rolling heavy-load deformation zone, the surface of the roll is in contact with the surface of the strip, and relative movement occurs. The deformation resistance will also cause the roll to be elastically flattened, which affects the shape of the heavy-load deformation zone. The heavy-load contact heat transfer conditions in the deformation zone will largely affect the contact friction conditions of the strip, oil film thickness, lubrication conditions and forming accuracy or dimensional error of the final product, resulting in differences in flow stress, uneven lateral load across the roll gap, local hot spots, thermal scratches, thermal scratches as well as flatness, plate thickness and surface quality problems. Because the heat transfer of the strip in the roll gap deformation zone is a complex process that integrates many phenomena, on the one hand, the rolled piece and the roll contact and transfer heat under high pressure, and the roll carries heat from the relatively high-temperature rolled piece, causing a strong temperature drop on the surface of the rolled piece; on the other hand, the deformation heat and friction heat generated by the plastic deformation of the rolled piece and the contact friction also promote the temperature rise of the rolled piece. The study of the dynamic contact heat transfer in the rolling heavy-load deformation zone is a very complicated task, and the accurate acquisition of the dynamic contact heat transfer coefficient between the roll and the rolled piece in the heavy-load deformation zone is a key factor for studying the heat transfer mechanism in the heavy-load deformation zone.

Figure 2B:
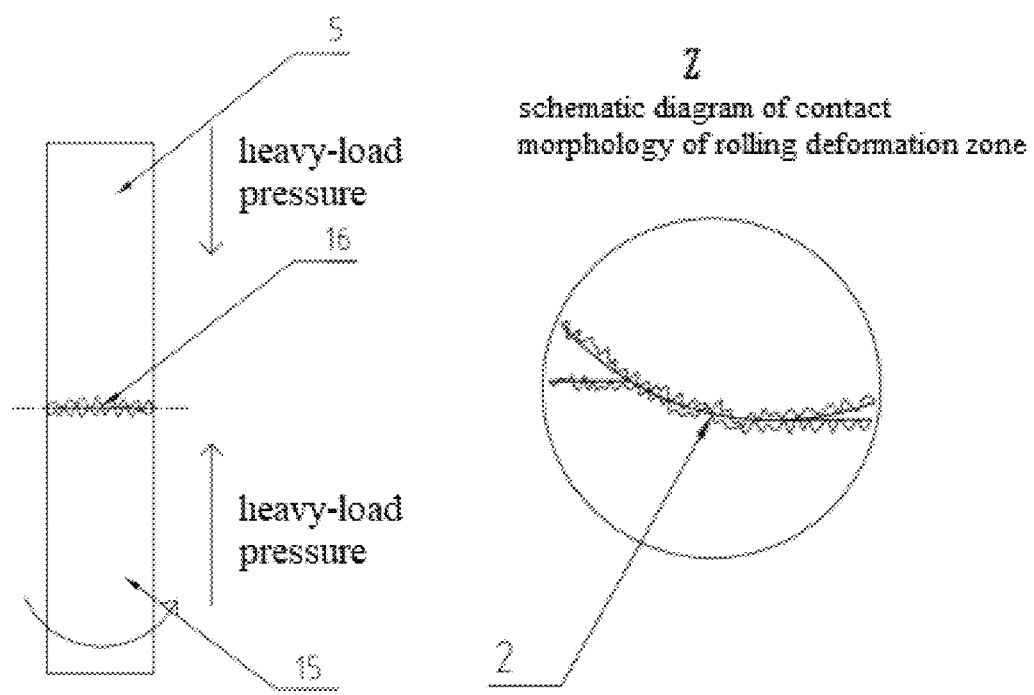
FIG. 2b is a schematic diagram of the contact interface morphology of the two specimens in the simulated rolling heavy-load deformation zone according to the embodiment of the present invention.

FIG. 2b is a schematic diagram of the contact interface morphology of two specimens in the simulated rolling heavy-load deformation zone according to the embodiment of the present invention.

The device controls the contact interface surface morphology (surface roughness) between the speed-adjustable rotating hot end 15 and the pressure-adjustable fixed cold end 5 to be the same as the contact morphology (surface roughness) between the rolled piece 20 and the roll 19, and the load and speed match the actual rolling conditions, the contact interface is etched with oil reservoir, and the flow rate of lubricant introduced into the interface by the hydraulic oil pump is controlled by the closed-loop control system to form a lubricant film consistent with the rolling process, simulating the real rolling process, and obtaining the dynamic contact heat transfer coefficient in the heavy-load deformation zone.

Figure 3:
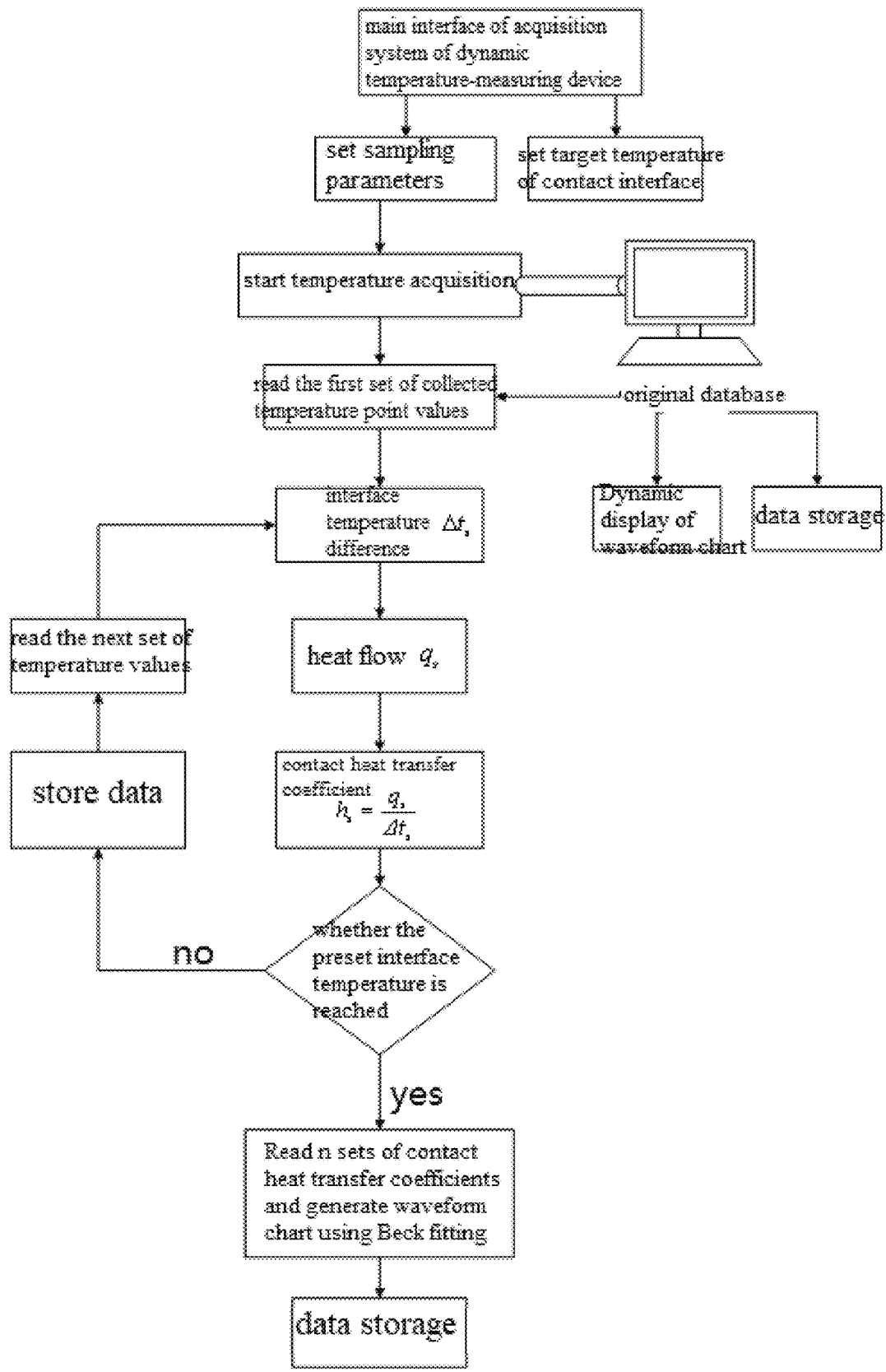
FIG. 3 is a schematic diagram of the calculation process and control process of dynamic contact heat transfer coefficient under heavy-load conditions used in the embodiment of the present invention.

FIG. 3 shows the calculation process and control process of the dynamic contact heat transfer coefficient under heavy-load conditions used in this embodiment.

The calculation process is as follows: first, open the main interface of the Labview acquisition system and set parameters such as sampling frequency, target temperature of the contact interface, and data storage location. Then check the stability and accuracy of the thermocouple connection, start the temperature acquisition system, and the original database of the temperature acquisition system receives the temperature data collected by the thermocouple and dynamically displays and stores them in real time. At the same time, the contact heat transfer coefficient calculation software starts to read the first set of collected temperature point values for dynamic contact heat transfer coefficient calculation. The calculation formula for the contact heat transfer coefficient is as follows:

$$h_s = \frac{q_s}{\Delta t_s}$$

$$q_s = \lambda \left(\frac{dt}{dx}\right)_{average}$$

where, $h_s$ is the contact heat transfer coefficient; $q_s$ is the heat flow density; $\Delta t_s$ is the temperature drop at the contact surface; $\lambda$ is the thermal conductivity of the specimen material;

$$\left(\frac{dt}{dx}\right)_{average}$$

is the average temperature gradient in the axial direction of the specimen.

The contact heat transfer coefficient calculation software sequentially calculates the temperature drop $\Delta t_s$ at the contact surface, the average temperature gradient in the axial direction of the specimen $$\left(\frac{dt}{dx}\right)_{average},$$

the heat flow density $q_s$, and calculates the contact heat transfer coefficient of the first set of temperature points based on the above parameters. When the interface temperature does not reach the preset value, the contact heat transfer coefficient calculation software reads the next set of temperature values, calculates the contact heat transfer coefficient under the current data, and repeats the process until the interface temperature reaches the preset temperature value, the temperature acquisition system stops collecting and calculating, and draws a waveform chart based on each set of calculated contact heat transfer coefficients, uses the Beck nonlinear fitting method to eliminate experimental errors, and obtains the dynamic contact heat transfer coefficient law curve.

Figure 4:
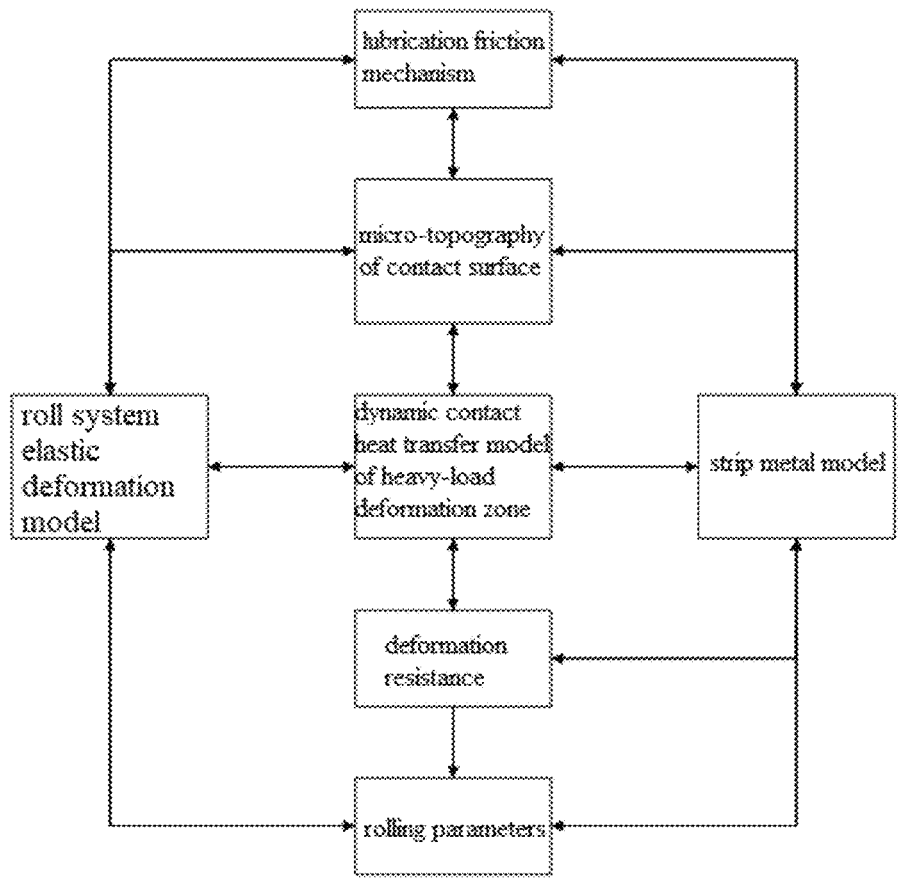
FIG. 4 is a schematic diagram of the relationship between the rolling heat transfer conditions and the roll system elastic model and the strip metal model.

FIG. 4 shows the relationship between rolling heat transfer conditions and roll system elastic model, strip metal model.

Rolling heat transfer is a complex process, including the convective heat transfer between the roll system strip and the coolant air lubricating oil, the contact heat transfer between the working roll and the strip, the heat transfer caused by the strip plastic deformation and friction. According to the dynamic contact heat transfer model of the heavy-load deformation zone, i.e., the deformation resistance, the micro-topography of the contact surface, and the friction and lubrication conditions, the contact heat transfer coefficient of the heavy-load deformation zone is calculated, and the corresponding boundary conditions are obtained, which can provide the dynamic heat transfer coefficient of the heavy-load interface for the roll system elastic deformation model and the strip metal model, and accurately calculate the heat source distribution, temperature change and thermal convexity evolution law in the deformation zone.

Figure 5A:
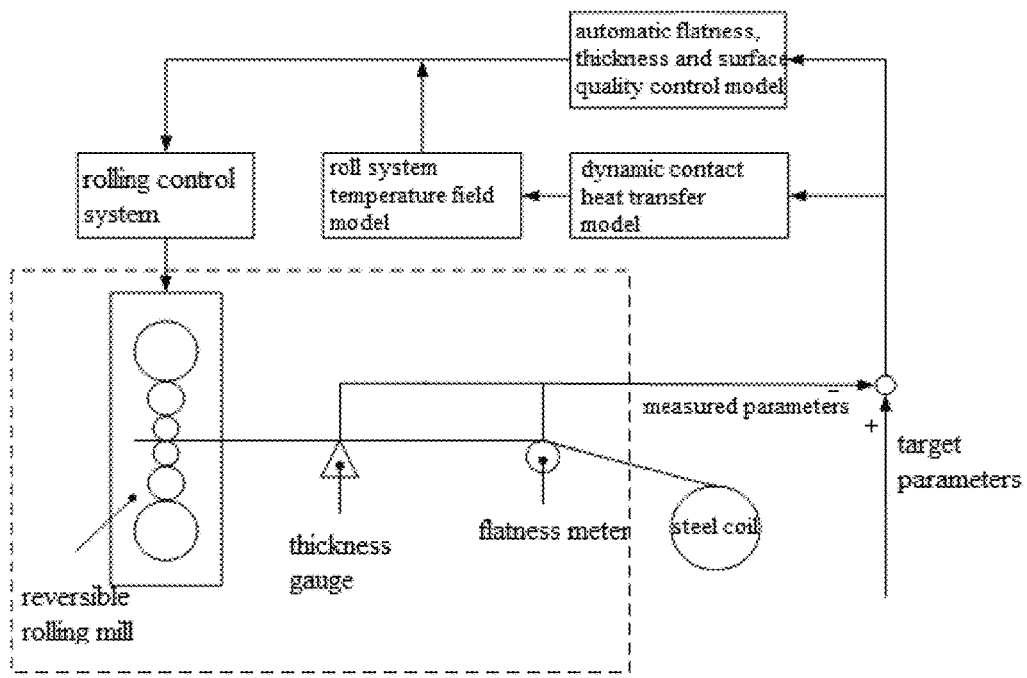
FIG. 5a shows the dynamic contact heat transfer model obtained in an embodiment of the present invention applied to the closed-loop control system of a reversible rolling mill.

FIG. 5a is a schematic diagram of the application of the dynamic contact heat transfer coefficient obtained by an embodiment of the present invention to the closed-loop control system of a reversible rolling mill.

The traditional closed-loop control system of reversible rolling mill can realize the closed-loop control of flatness and thickness through flatness meter and thickness gauge. Dynamic contact heat transfer simulation device for rolling heavy-load deformation zone, which can simulate the dynamic heat transfer conditions of rolling heavy-load deformation zone, namely rolling force, rolling speed, lubrication, cooling, etc., and feedback the measured dynamic contact heat transfer coefficient to the closed-loop control system of the reversible rolling mill, by comparing the measured contact heat transfer coefficient with the ideal contact heat transfer coefficient, the closed-loop control system adjusts the rolling force, rolling speed, lubrication, cooling and other processes of the reversible rolling mill online to obtain the ideal contact heat transfer, which makes the temperature of the roll and the rolled piece controllable during the rolling process, and at the same time provides the necessary heat transfer parameters for the dynamic contact heat transfer model and the roll system temperature field model of the reversible mill rolling.

Figure 5B:
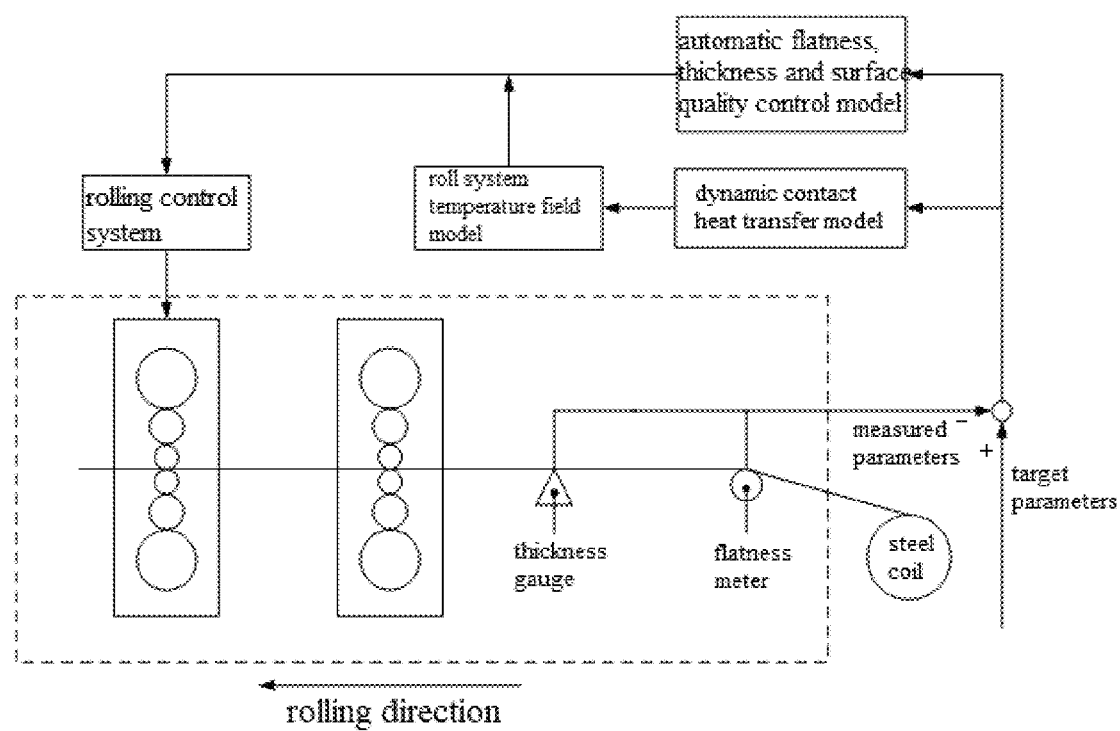
FIG. 5b shows the dynamic contact heat transfer model obtained in an embodiment of the present invention applied to the closed-loop control system of a continuous rolling mills.

FIG. 5b shows the dynamic contact heat transfer coefficient obtained by an embodiment of the present invention applied to the closed-loop control system of the continuous rolling mills.

The difference between the reversible rolling mill and the continuous rolling mills is that the dynamic contact heat transfer coefficient obtained by the reversible rolling mill is fed back to the closed-loop control system of the reversible rolling mill to adjust the process parameters of the reverse rolling of the reverse rolling mill; the dynamic contact heat transfer coefficient obtained by the continuous rolling mills is fed back to the closed-loop control system of the continuous rolling mills to adjust the rolling process parameters of the next group of rolling mills.

The above-mentioned embodiments only describe the preferred embodiments of the present invention and do not limit the scope of the present invention. Without departing from the design spirit of the present invention, various modifications and improvements made to the technical solutions of the present invention by a person of ordinary skill in the art shall fall within the scope of protection determined by the claims of the present invention.

What is claimed is:

1. A dynamic contact heat transfer simulation device for rolling heavy-load deformation zone, comprising a thermal insulation cover, a hydraulic cylinder, a control relay, a pressure sensor, a pressure-adjustable fixed cold end, a thermocouple, a control system, and a data acquisition system, a heating furnace, a motor, a rotating chuck, a temperature-adjustable heat-conducting rod, a connecting mechanism, a temperature-measuring slip ring mechanism, a speed-adjustable rotating hot end, a moving chuck and a cooling pipe; wherein the heating furnace is used for heating the temperature-adjustable heat-conducting rod, and a temperature rise curve of the heating furnace is controlled by the control system;

a first end of the temperature-adjustable heat-conducting rod is clamped on the rotating chuck, and the rotating chuck is connected with the motor; a second end of the temperature-adjustable heat-conducting rod is connected to the speed-adjustable rotating hot end through the connecting mechanism, and the motor drives the speed-adjustable rotating hot end to rotate together by driving the adjustable-temperature heat-conducting rod to rotate;

lubricant is introduced into contact interface between the speed-adjustable rotating hot end and the pressure-adjustable fixed cold end, and the control system controls lubricant quantity of a hydraulic oil pump so that lubricating oil slowly flows into the contact interface between the pressure-adjustable fixed cold end and the speed-adjustable rotating hot end, to ensure that a stable lubricating oil film is formed at the contact interface;

the moving chuck is used to mount the pressure-adjustable fixed cold end, and the cooling tube is provided inside the moving chuck; the thermocouple installed on the pressure-adjustable fixed cold end for temperature measurement passes through the thermal insulation cover and is connected to the data acquisition system;

the hydraulic cylinder is connected with the moving chuck, and the hydraulic cylinder pushes the moving chuck to drive the pressure-adjustable fixed cold end to contact with the speed-adjustable rotating hot end, and ensure a stable pressure between two specimens, the control system controls the hydraulic cylinder through a hydraulic control relay;

the pressure sensor installed between the hydraulic cylinder and the moving chuck is connected to the data acquisition system;

the thermocouple installed on the speed-adjustable rotating hot end for temperature measurement is slidably connected to the temperature-measuring slip ring mechanism, and transmits signals to the data acquisition system through outer ring wire of the temperature-measuring slip ring mechanism;

the control system is a control device that controls the temperature rise curve of the heating furnace, and processes, calculates, and stores the data collected by the data acquisition system;

the control system adopts a closed-loop control system to synchronously control cold end pressure, hot end rotation speed, contact interface lubrication flow and thermocouple acquisition, and simulate thermal conductivity law of transient temperature under different rolling speeds, pressures, cooling, lubrication and friction conditions in real time according to actual rolling conditions, while calculating contact dynamic heat transfer coefficient of the heavy-load deformation zone.

2. The dynamic contact heat transfer simulation device for rolling heavy-load deformation zone according to claim 1, wherein the contact interface between the speed-adjustable rotating hot end and the pressure-adjustable fixed cold end is etched with an oil reservoir capable of storing the lubricant, and an oil through hole is machined at the center of the speed-adjustable rotating hot end, and the hydraulic oil pump injects the lubricant into the contact interface through the oil through hole to form a lubricating oil film with a stable thickness.

3. The dynamic contact heat transfer simulation device for rolling heavy-load deformation zone according to claim 1, wherein the temperature-measuring slip ring mechanism is mounted on the speed-adjustable rotating hot end, an inner ring of the temperature-measuring slip ring mechanism rotates synchronously with the speed-adjustable rotating hot end, and an outer ring of the temperature-measuring slip ring mechanism is fixed to prevent winding of the thermocouple in rotating state.

* * * * *